INVENTOR.
PETER T. CALABRETTA

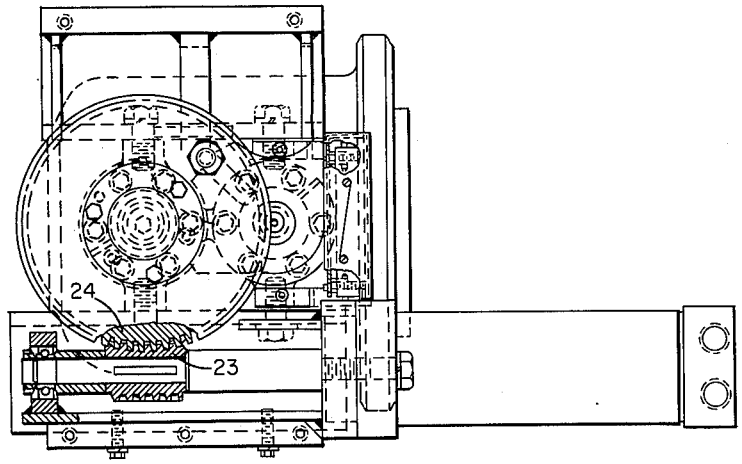
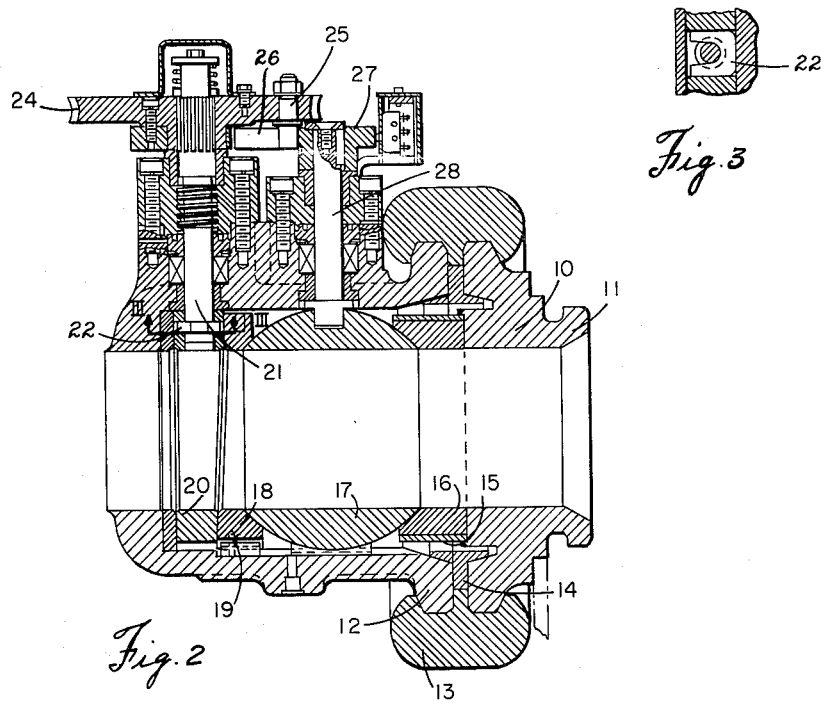

July 19, 1966  P. T. CALABRETTA  3,261,483
ADAPTER VALVE

Filed May 24, 1963  3 Sheets-Sheet 3

INVENTOR.
PETER T. CALABRETTA
BY Roland A. Anderson
Attorney

United States Patent Office 3,261,483
Patented July 19, 1966

3,261,483
ADAPTER VALVE
Peter T. Calabretta, Port Chester, N.Y., assignor to the United States of America as represented by the United States Atomic Energy Commission
Filed May 24, 1963, Ser. No. 283,125
3 Claims. (Cl. 214—18)

The subject invention relates to nuclear reactor technology and in particular is concerned with special valving for use in loading and unloading a high pressure, high temperature liquid moderated and cooled nuclear reactor while the reactor is in operation.

In the operation of nuclear reactors, it is necessary to provide means for adding, removing, or repositioning the fuel elements. Where the fuel elements are surrounded by a liquid coolant and/or moderator, such as heavy water, these operations present a difficult problem. Throughout transfer of the fuel elements, a heavy water environment must be maintained to insure decay heat dissipation. Additional problems are presented by virtue of the fact that the heavy water may be at temperatures as high as 560° F. and at pressures as high as 1,460 pounds per square inch. To open a fuel channel under such conditions is a formidable task, and in the operation of a large power reactor this must be done two or three times each day without shutting down the reactor.

It is an object of this invention to provide a remotely operable ball valve having means for opening and closing the valve without wiping action between the ball member and its seat.

It is a further object to provide a remotely operable valve in combination with resilient means to accommodate misalinement between the valve and a conduit to which it is to be attached.

It is a still further object to provide remotely operable means in combination with the valve means whereby movement of bodies through the adapter valve assembly may be limited at a predetermined point.

It is a further object to provide means whereby the temperature of the valve can be matched to that of the conduit to which it is attached, and whereby the temperature and liquid pressure conditions in the reactor tubes may be maintained during refueling of the reactor.

The foregoing objects are achieved in the subject adapter valve. Normally, the valve is carried on an element of a nuclear reactor refuelling head, which is designed for remote operation. When a tube in a reactor is to be loaded or unloaded, the adapter valve is clamped and sealed to a reactor tube. The valve contains a ball valve and a wedge to load the ball valve against its seat. In order to preclude any wiping action between the ball and seat, a pneumatically operated Geneva geared valve operator is provided so that the wedge is always raised to unload the ball from its seat before the ball can be rotated to open or close a passage through the valve assembly. A flexible joint and homing sensors associated with the valve assembly accommodate any minor misalinement between the valve assembly and the reactor tube to which it is to be attached. Finally, pneumatically actuated tongs are provided in combination with the passage through the valve assembly. The tongs are operable between an open position, where the passage through the assembly is open, and a closed position in which the tongs block the passage and prevent objects from moving beyond the point of blockage.

The invention may be more fully understood by reference to the drawings, wherein:

FIG. 2 is a cross section of the ball valve, loading wedge and Geneva gearing for actuating the same;

FIG. 3 is a cross section taken along lines III—III of FIG. 2; and

FIG. 4 is a top view, partly in section of the valve illustrated in FIG. 2;

Figure 1:
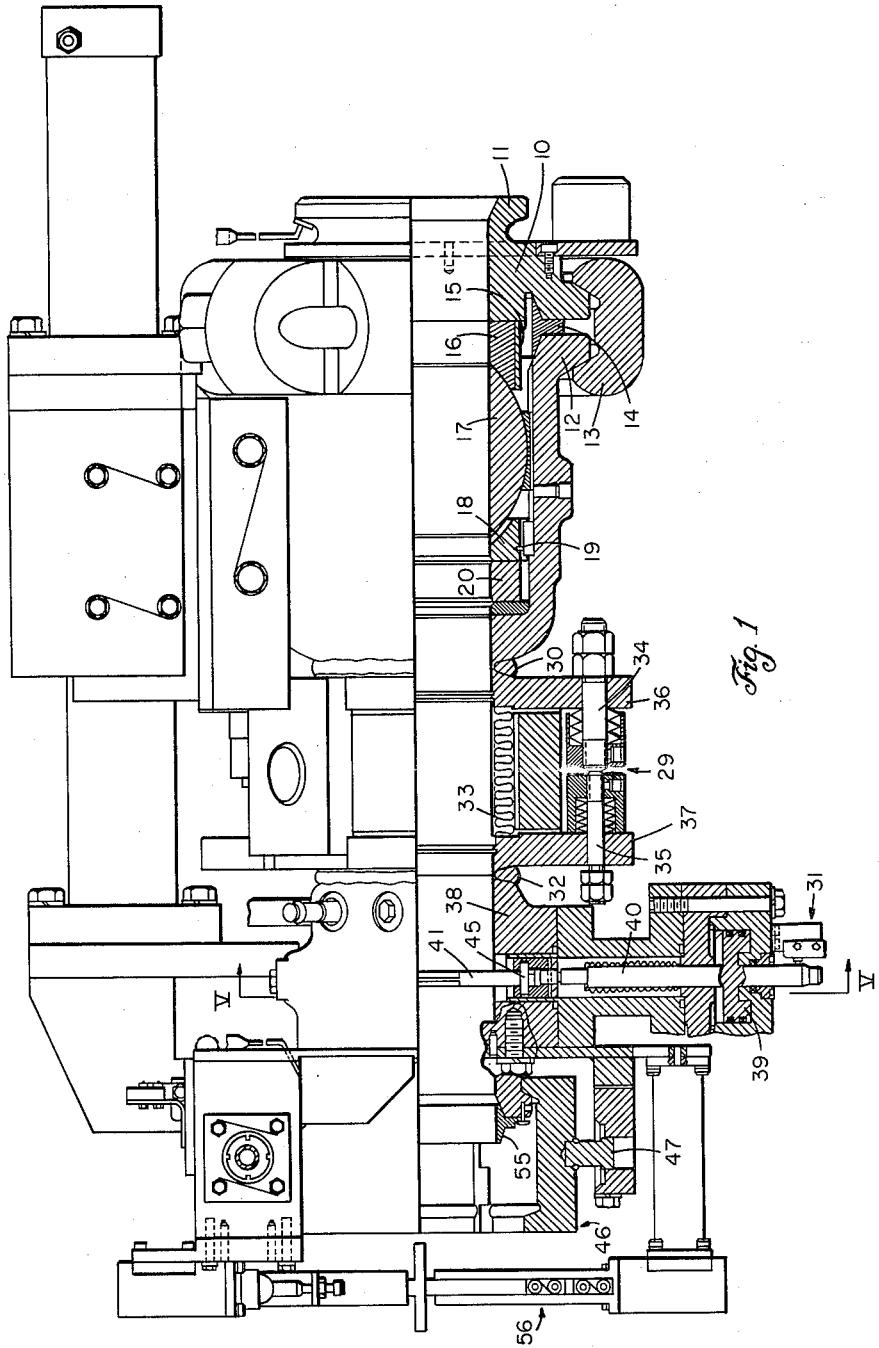
FIG. 1 is a view partly in elevation and partly in cross section of an adapter valve assembly constructed in accord with this invention.

Turning to FIGS. 1 and 2, it will be seen that the subject adapter valve consists of a flange member 10 having a central opening therethrough. The flange has a lip 11 for use in clamping the valve assembly to an element of a refuelling machine head (not illustrated). Flange 10 is permanently secured to flange 12 on the valve housing by means of a commercially available locking clamp 13 and gasket 14.

Welded to the flange 10 is a collar 15 which retains valve seating means 16 for the ball valve 17. The ball may be made of machined graphite and has a passageway therethrough which is alineable with the passage through the entire adapter valve assembly. A second valve seating surface in the form of a seal ring 18 at the opposite side of the valve is mounted on a pin 19 which permits a minor amount of axial movement with respect to the ball 17.

A wedge 20, having a passage therethrough corresponding to the passage through the ball, is arranged to apply pressure to the seal ring 18 to load the valve. The wedge is raised and lowered by means of a stem 21 operating against a yoke 22 (FIG. 3) set in the upper portion of the wedge. Stem 21 is actuated by a $CO_2$ driven worm gear 23 (FIG. 4) which drives a spur gear 24 to rotate the stem 21 and thus raise and lower it.

A pin 25 (FIG. 2) slides in a slot 26 in Geneva gear 27. The latter is secured to the stem 28 of the ball valve. Rotation of spur gear 24 carries with it the pin 25, thereby causing intermittent movement of the Geneva gear 27. By means of this movement, rotation of the gear 24 first lifts the wedge to unload the seal ring 18. Thereafter, continued rotation of gear 24 causes rotation of the Geneva gear 27 in the well known manner to move the ball. Since the seal ring is unloaded before the ball can move, there is no wiping action between the ball and its seats and scoring or scratching is thereby avoided.

With reference to FIG. 1, it will be seen that a flexible section 29 has been provided to accommodate slight misalinement of the valve assembly and reactor tube. The flexible section is secured to the valve body by means of a weld as shown at 30 and to the tong assembly 31 by means of a further weld 32. The flexible section is sealed by means of a bellows 33 and is supported by a series of circumferentially arranged, spring loaded, opposed bolts 34, 35 in flanges 36, 37 (FIG. 1).

Figure 5:
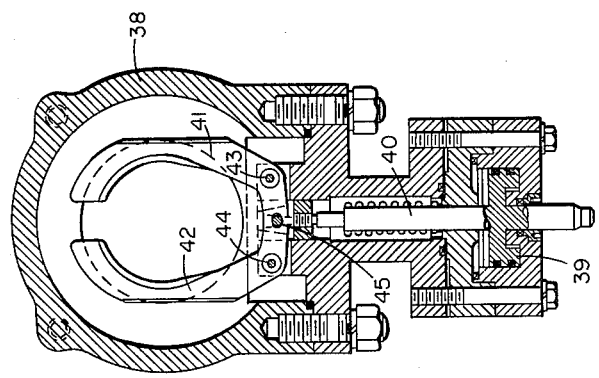
FIG. 5 is a cross section taken along line V—V of FIG. 1 showing the construction of the fuel stop tongs.

The next element of the adapter valve assembly is the fuel stop mechanism shown at 31 (FIG. 1). This is carried in a tubular housing 38 which is secured by weld 32 to the flange 37. The mechanism consists of a remotely operated piston 39 (FIGS. 1 and 5) which actuates a bellows sealed stem 40 between an upper and a lower position. A pair of fuel stop fingers 41, 42 pivoted at 43 and 44 respectively are movable by means of movement of pin 45 between a closed position, illustrated in FIG. 5 and an open position. In the closed position, the fingers act as a stop, preventing a fuel bundle from moving further through the adapter valve assembly.

A forward clamp assembly 46 completes the adapter valve. This assembly is held by a pin 47 carried by a bracket 48 secured to the fuel stop mechanism. The lower arm 49 carried by the pin, carries pivots 50, 51

Figure 6:
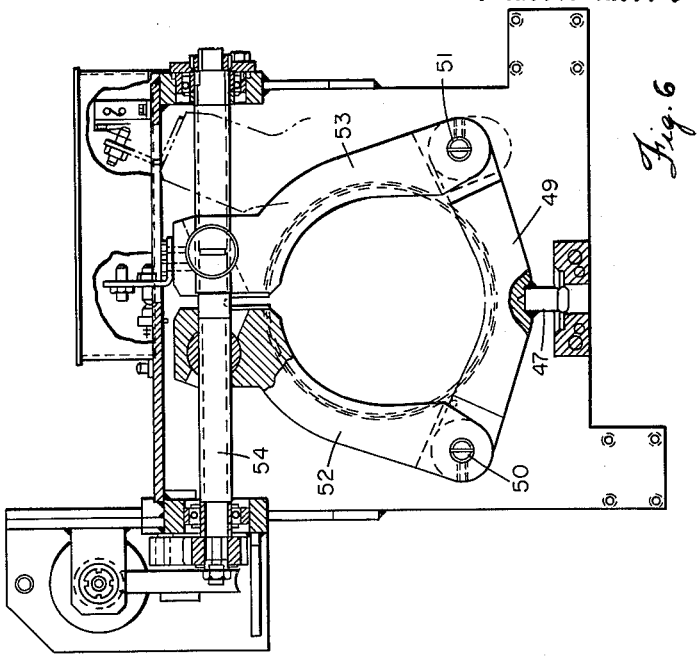
FIG. 6 is a partly sectioned view of the forward clamp assembly according to this invention.

(FIG. 6) to which the clamping arms 52, 53 are attached. Rotation of a reversely threaded shaft 54 opens and closes the clamping arms to attach the adapter valve assembly to a flanged reactor tube. A sealing gasket 55 (FIG. 1) secured to the end of the fuel stop housing seals the connection between the valve and the flange on the reactor tube (not shown). A homing sensor assembly 56 gives final X and Y control to locate the adapter valve assembly to the applicable reactor tube.

Operation

In refueling a reactor tube, the adapter valve is maintained on a refueling machine at a body temperature within 50° F. of the reactor process tube thermal condition before clamping to the reactor.

Thermocouples, placed on crtical points of the adapter valve, control electrical heaters which maintain the temperature at the desired level.

The adapter valve is normally clamped to the leading section of a component of the refueling machine head. The entire assembly is homed to the process tube by means of the homing-sensor assemblies mounted on the adapter valve leading edge. In the process of completing the homing operation, flexing of the adapter valve forward section occurs as required.

The forward section moves about the reference centerline established by the central axis of the adapter valve rear. This operation is essential to assure accurate alinement of the seal between the adapter valve and end fitting, and proper orientation of the remote clamp segments to the end-fitting hub.

Face-to-face engagement of the adapter valve to end fitting is positively indicated by a signal and adequate pressure is applied to the mating faces and hold the units together.

The clamp pneumatic motor is then actuated through gear reduction until a limit switch indicates the clamp is properly closed. The adapter valve is then opened by a pneumatic motor driving through the worm, worm wheel, modified Geneva, screw, nut and ring wedge mechanism. This actuation is sequenced to avoid ball rotation against the graphite seal while the ball and seal are preloaded. This preload had previously been applied for proper adapter valve seating before full internal pressure was applied. Succeeding steps in the refueling operations are performed with the various mechanisms of the refueling machine. These operations will require the passage of a number of components through the adapter valve.

The fuel stop is employed as a control device during the insertion or removal of a new or spent fuel bundle by the loading machine ram. As the ram moves through its prescribed motion for fuel element removal, position indication continues to a point where a signal is transmitted to the appropriate fuel-stop-control valve. Actuation by $CO_2$ of the fuel stop occurs at or before the fuel bundles pass the plane of the fuel-stop fingers.

Through a pneumatic piston coupled to a bellows-sealed stem, the fuel stop linkage is moved into a position where it can separate adjacent fuel bundles. When this action has been completed, a limit switch signals the ram actuation system to stop ram motion.

This process is reversed for fuel element insertion.

After completion of the necessary operations for loading the reactor, the adapter valve must be mechanically cycled from opened to closed. The adapter valve remains at the reactor face until refueling is completed. The thermal condition of the assembly will remain constant and matched to the end-fitting temperature. The thermocouples and a temperature control subsystem, supplied with the adapter valve heater assembly, accurately control this condition.

Valve-closure technique is the same for all stages of the refueling cycle. To close the adapter valve, the pneumatic actuator is rotated in the reverse direction by appropriate valving through a $CO_2$ header. The Geneva drive is then actuated to rotate the ball and place it perpendicular to the flow passage. The rotary action of the actuator continues and a torque transmitted through the worm, worm wheel, screw and nut to actuate the wedge with sufficient force to preload the ball-seal combination. The pre-load is sufficient to seal the valve at minimal pressures until the fluid pressure forces are large enough to be completely effective.

To remove the adapter valve from the pressure tube, the end-seal tube and its shutoff valve must again be remotely clamped to the refueling machine end of the adapter valve. After an end seal has been replaced in the reactor tube and tested for proper sealing, the adapter valve is closed.

The adapter valve forward clamp actuating mechanism is now actuated and the clamp segments are fully opened to release the clamp from the end fitting hub.

The loading machine head with the adapter valve clamped to it, can now be withdrawn from its reactor face position.

Having described my invention, I claim:

1. A rotatable ball valve capable of being opened and closed without wiping action between the ball and its seats, said valve comprising—
   a. a housing having a passageway therethrough,
   b. a ball valve mounted therein,
   c. means for rotating the ball valve,
   d. a pair of valve seats within the housing consisting respectively of a fixed sealing ring and a movable sealing ring mounted on a pin for limited movement axially of the housing,
   e. a wedge extendable perpendicularly across the passageway in the housing and having a passageway therethrough alineable with the passageway through the housing,
   f. said wedge being engageable with the movable sealing ring to move said ring axially of the passageway into intimate sealing contact with the ball valve,
   g. means for raising and lowering the wedge, and
   h. means including Geneva gearing inter-connecting the ball valve and wedge whereby the wedge is first raised to unload the valve seats and thereafter the valve is rotated, thereby avoiding wiping action between the valve and valve seats during opening and closing of the valve.

2. An adapter valve assembly for remotely servicing a nuclear reactor tube containing a liquid under pressure, the assembly consisting of:
   a. means for attaching the adapter valve assembly to the nuclear reactor tube and additional means for attaching the assembly to a refueling machine,
   b. a rotatable ball valve in said assembly said valve comprising:
      (1) a housing having a passageway therethrough,
      (2) a ball valve mounted therein,
      (3) means for rotating the ball valve,
      (4) a pair of valve seats within the housing consisting respectively of a fixed sealing ring and a movable sealing ring mounted on a pin for limited movement axially of the housing,
      (5) a wedge extendable perpendicularly across the passageway in the housing and having a passageway therethrough alineable with the passageway through the housing,
      (6) said wedge being engageable with the movable sealing ring to move said ring axially of the passageway into intimate sealing contact with the ball valve,
      (7) means for raising and lowering the wedge, and
      (8) means including Geneva gearing inter-connecting the ball valve and wedge whereby the wedge is first raised to unload the valve seats and thereafter the valve is rotated, thereby avoiding wiping action between the valve and valve seats during opening and closing of the valve; and c. a bellows sealed flexible section in said adapter valve assembly to accommodate minor misalinement of the adapter valve assembly and the nuclear reactor tube.

3. An adapter valve assembly as set forth in claim 2 having in combination therewith pneumatically operable means for blocking passage of objects through said assembly.

References Cited by the Examiner

UNITED STATES PATENTS

| | | | |
|---|---|---|---|
| 2,709,888 | 6/1955 | Holl | 138—45 X |
| 2,796,878 | 6/1957 | Atkinson | 137—268 X |
| 2,863,629 | 12/1958 | Knox | 251—171 |
| 3,137,397 | 6/1964 | Nicoll | 214—18 |
| 3,168,444 | 2/1965 | Ingram | 214—18 |

FOREIGN PATENTS 74,966  9/1932  Sweden.

WILLIAM F. O'DEA, *Primary Examiner.*

ISADOR WEIL, *Examiner.*

H. WEAKLEY, *Assistant Examiner.*